United States Patent

Curatolo et al.

[11] Patent Number: 5,888,649
[45] Date of Patent: Mar. 30, 1999

[54] RADIATION-CURABLE RELEASE COATING COMPOSITIONS

[75] Inventors: Benedict S. Curatolo, Valley View; Thomas J. Fox, Euclid, both of Ohio

[73] Assignee: Avery Dennison Corporation, Pasadena, Calif.

[21] Appl. No.: 911,683

[22] Filed: Aug. 15, 1997

Related U.S. Application Data

[63] Continuation-in-part of Ser. No. 584,254, Jan. 11, 1996, Pat. No. 5,804,301.

[51] Int. Cl.$^6$ .......................................................... C09J 7/02
[52] U.S. Cl. ............................ 428/352; 428/354; 522/99; 528/26
[58] Field of Search ..................................... 428/352, 354; 522/99; 528/26

[56] References Cited

U.S. PATENT DOCUMENTS

| | | |
|---|---|---|
| 2,532,011 | 11/1950 | Dahlquist . |
| 4,008,115 | 2/1977 | Fairbanks . |
| 4,388,345 | 6/1983 | Kishida . |
| 4,472,480 | 9/1984 | Olson . |
| 4,530,579 | 7/1985 | Drahnak . |
| 4,603,058 | 7/1986 | Adams . |
| 4,643,730 | 2/1987 | Chen . |
| 4,710,190 | 12/1987 | Wood . |
| 4,942,006 | 7/1990 | Grossa . |
| 4,942,066 | 7/1990 | Fan . |
| 5,026,446 | 6/1991 | Johnston . |
| 5,106,383 | 4/1992 | Madder . |
| 5,175,077 | 12/1992 | Grossa . |

FOREIGN PATENT DOCUMENTS

| | | |
|---|---|---|
| 0457499 | 11/1991 | European Pat. Off. . |
| 0505737 | 9/1992 | European Pat. Off. . |
| 2129689 | 5/1984 | United Kingdom . |

OTHER PUBLICATIONS

"Electromeric Electron Beam–Cured Coatings: Structure–Property Relationships"; Oraby et al.; Journal of Applied Polymer Science; vol. 23; pp. 3242–3245; (1979).

*Primary Examiner*—Jenna Davis
*Attorney, Agent, or Firm*—Renner, Otto, Biosselle & Sklar

[57] ABSTRACT

A radiation-curable coating composition is described which comprises: (A) from about 60% to about 99% by weight of at least one polyfunctional acrylate monomer containing at least one internal flexible unit; (B) from about 1% to about 30% by weight of at least one other reactive vinyl or unsaturated monomer provided the reactive monomer is not the same as the monomer of (A) or (C); (C) from 0.01% to about 10% by weight of at least one organopolysiloxane containing one or more groups which are reactive toward free radical polymerization; and (D) from about 0% to about 10% by weight of at least one photoinitiator.

In a preferred embodiment, the reactive vinyl monomer (B) is selected from the group consisting of vinyl ethers, mono- or polyfunctional acrylate monomers or oligomers, and mixtures thereof. A method of coating a substrate utilizing the radiation-curable release coating compositions of the present invention, and a substrate coated in accordance with the method of the invention are also described.

48 Claims, No Drawings

RADIATION-CURABLE RELEASE COATING COMPOSITIONS

RELATED APPLICATION

This application is a continuation-in-part of patent application Ser. No. 08/584,254, filed Jan. 11, 1996 now U.S. Pat. No. 5,804,301.

TECHNICAL FIELD

This invention relates to release coating compositions. More particularly, the invention relates to radiation-curable release coating compositions which may be deposited upon substrates such as polymeric films to provide a release coating with improved printability and other surface characteristics.

BACKGROUND OF THE INVENTION

Polymeric films generally are smooth and have low surface tensions due to their inherent characteristics. Printing on untreated films often results in unsatisfactory print quality due to insufficient surface wetting and insufficient ink adhesion. There is also the possibility of surface contaminants on film surfaces which can further reduce print quality.

Various coatings have been applied to substrates such as polymeric films to improve their printability. The improved ink performance of coated films may be due to improved surface tension, altered polarity, different degrees of micro-roughness, or other physical or chemical factors. Polymeric coatings can be applied as solutions, emulsions, dispersions, suspensions or 100% solid systems, by a number of methods such as roll coating, gravure coating, rod coating, and other methods known to those skilled in the art.

Ultraviolet (UV) light or electron beam (EB) curing of 100% solid systems is desirable for a number of reasons including high efficiency, high productivity and improved environmental acceptability. With 100% solid systems cured by UV or EB technology, no solvents are required, and this results in reduced pollution possibilities as well as reduced capital equipment and process costs due to the lack of solvent evaporation and recovery requirements. In addition, the absence of a solvent results in higher line speeds without the limitations of oven-drying capabilities, and curing occurs rapidly at low temperatures which reduces process effects on substrates which may be heat-sensitive. The coatings themselves generally have fewer defects and, consequently, improved properties since it is not necessary for solvent molecules to diffuse out of the coating during cure. For the reasons outlined above, space requirements, waste, and energy consumption are also lower with radiation-curable systems.

Radiation curing of polymeric systems may utilize electron beam curing or ultraviolet curing. UV curing of polymeric systems requires the presence of at least one photoinitiator whereas curing by EB techniques does not require a photoinitiator. With the exception of the presence or absence of photoinitiator, the formulations cured by either UV or EB technology may otherwise be identical.

U.S. Pat. No. 4,008,115 (Fairbanks et al) describes a method of making a series of laid-on labels each of which has a solvent and abrasion-resistant radiation-cured overcoating. The patentees describe radiation-curable liquids which may be epoxy prepolymers acrylated to provide terminal polymerizable acrylate groups, or acrylated polyether-polyisocyanate prepolymers or oligomers which may be dissolved in acrylate monomers which are copolymerizable therewith. Suitable monomers include trimethylolpropane triacrylate, 1,4-butanedioldiacrylate, neopentylglycol diacrylate, pentaerythritol tetraacrylate, 1,6-hexanedioldiacrylate, etc.

U.S. Pat. No. 4,643,730 (Chen et al) also describe radiation-curable formulations for polyethylene film reinforcement relating to disposable diapers. The patentees describe a curable coating composition which is a mixture consisting essentially of (a) from about 30% to about 60% by weight of at least one compound selected from the group consisting of urethane acrylate acrylic oligomers, acrylated acrylic oligomers and epoxy acrylate acrylic oligomers; (b) from 30% to 50% by weight of at least one compound selected from the group consisting of monofunctional acrylate monomers, difunctional acrylate monomers and acrylic monomers; and (c) about 0% to 15% by weight of trifunctional acrylate monomers with the proviso that the component materials total 100% by weight.

U.S. Pat. No. 4,942,060 (Grossa) relates to solid imaging methods utilizing photohardenable compositions of self-limiting thickness by phase separation. The photohardenable compositions described in this patent contain at least one photohardenable monomer or oligomer and at least one photoinitiator. A list of suitable monomers is found in Col. 5, line 42 to Col. 6, line 27. Included in the list of suitable monomers are triethylene glycol dimethacrylate, trimethylolpropanetriacrylate, ethoxylatedpentaerythritoltriacrylate,propoxylated neopentyl glycol diacrylate and methacrylate, and mixtures thereof.

U.S. Pat. No. 5,418,016 (Cornforth et al) describes radiation-curable compositions comprising N-vinyl formamide and an oligomer which includes epoxy-acrylate resins, polyester-acrylate resins, polyurethane-acrylate resins, acrylic acrylate resins, vinyl-ether resins, etc. The compositions are reported to be useful for a range of applications including pigmented and unpigmented coatings, printing inks, adhesives, etc.

EP Application 505 737 A1 describes UV curable coating compositions which include an acrylated aliphatic urethane in combination with a methacrylic functionalized colloidal silica and acrylic ester monomer. The coating can be applied to a thermoplastic substrate.

U.S. Pat. No. 5,436,073 (Williams et al) describes composite laminates comprising (A) a substrate sheet of paper; (B) a first coating bonded to one surface of the substrate comprising a radiation-cured acrylic composition comprising, prior to curing (i) an acrylated or methacrylated organic polyamino compound, and (ii) an acrylated or methacrylated organic polyhydroxy compound, and (C) a second coating comprising a polyolefin film bonded to the other surface of the substrate.

It is generally accepted that the use of multifunctional monomers and coatings leads to poor adhesion, and the use of monofunctional monomers leads to slow cure speeds and reduced chemical resistance and strength properties. For example, U.S. Pat. No. 5,418,016 discloses that high functionality monomers give rapid cure speeds and high cross-link density leading to films of high hardness and tensile strength with excellent chemical resistance. The films, however, suffer from reduced adhesion. Monofunctional monomers, conversely, give slow cure speeds and low cross-link density resulting in cured films of lower hardness, tensile strength and with reduced chemical resistance.

SUMMARY OF THE INVENTION

A radiation-curable coating composition is described which comprises: (A) from about 60% to about 99% by weight of at least one polyfunctional acrylate monomer containing at least one internal flexible unit; (B) from about 1% to about 30% by weight of at least one other reactive vinyl or unsaturated monomer provided the reactive monomer is not the same as the monomer of (A) or (C); (C) from 0.01% to about 10% by weight of at least one organopolysiloxane containing one or more groups which are reactive toward free radical polymerization; and (D) from about 0% to about 10% by weight of at least one photoinitiator.

In a preferred embodiment, the reactive vinyl monomer (B) is selected from the group consisting of vinyl ethers, mono- or polyfunctional acrylate monomers or oligomers, and mixtures thereof. A method of coating a substrate utilizing the radiation-curable release coating compositions of the present invention, and a substrate coated in accordance with the method of the invention are also described.

DETAILED DESCRIPTION OF THE INVENTION

In one embodiment, the present invention is a radiation-curable release coating composition which comprises: (A) from about 60% to about 99% by weight of at least one polyfunctional acrylate monomer containing at least one internal flexible unit; (B) from about 1% to about 30% by weight of at least one other reactive vinyl or unsaturated monomer provided the reactive monomer is not the same as the monomer of (A) or (C); (C) from 0.01% to about 10% by weight of at least one organopolysiloxane containing one or more groups which are reactive toward free radical polymerization; and (D) from about 0% to about 10% by weight of at least one photoinitiator. In one embodiment, the composition is free of methacrylic functionalized colloidal silica. In another embodiment, the coating compositions are free of N-vinyl formamide.

The release coating compositions of the invention provide release coatings having desirable mechanical properties and chemical resistance properties.

The first essential component of the release coating compositions of the present invention is (A) at least one polyfunctional acrylate monomer containing at least one internal flexible unit. Throughout this specification and claims, the terms "acrylic" and "acrylate" are used generally to include derivatives of acrylic acids as well as substituted acrylic acids such as methacrylic acid, ethacrylic acid, etc., unless clearly indicated otherwise. The term internal flexible unit is intended to include units where the atoms contained in the unit can generally rotate around the bonds joining the atoms, and such units are within a chain and not terminal. Specific examples of flexible units useful in the present invention include ether groups (or hydrocarbyleneoxy groups), particularly aliphatic ether groups, hydrocarbylene groups containing at least about 8 carbon atoms, etc. Internal ester units are not considered flexible. The ether groups can be introduced into the polyfunctional acrylate monomers such as by reacting a polyhydroxy compound with an aliphatic oxide such as ethylene oxide or propylene oxide or combinations of ethylene oxide and propylene oxide to form an alkoxylated polyhydroxy compound, and thereafter reacting the alkoxylated polyhydroxy compound with an acrylic acid or acrylic ester. Polyhydroxy compounds containing ether groups also can be obtained by condensing (or dimerizing, trimerizing, etc.) polyhydroxy compounds such as ethylene glycol, propylene glycol, etc., to form derivatives such as diethylene glycol, triethylene glycol, tetraethylene glycol, polyethylene glycol, propylene glycol, dipropylene glycol, tripropylene glycol, tetrapropylene glycol, polypropylene glycol, etc., and thereafter reacting the ether containing polyhydroxy compound with an acrylic acid or acrylic ester.

The presence of the internal flexible unit in the polyfunctional acrylate monomers utilized in the coating compositions of the present invention results in a coating composition exhibiting improved adhesion to substrates. The multifunctional nature of these monomers results in fast cure and high cross-linking density. The use of polyfunctional acrylate monomers containing internal flexible units results in a three-dimensional network with flexibility between cross-links such that adhesion to substrates is enhanced. Although not wishing to be bound by any theory, it is believed that the flexibility obtained with the use of the polyfunctional acrylate monomers containing flexible units reduces the stress at interfaces which would be observed with typical hard, cross-linked coatings, and which would otherwise lead to reduced adhesion.

In one embodiment, the polyfunctional acrylate monomer (A) containing at least one internal flexible unit may be characterized by the formula

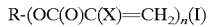

$$R\text{-}(OC(O)C(X)\!=\!CH_2)_n \quad (I)$$

wherein R is a hydrocarbyl group containing from about 4 to about 20 carbon atoms and one or more flexible units; X is hydrogen or an alkyl group containing from 1 to 8 carbon atoms; and n is at least 2. In preferred embodiments, the flexible units are ether groups, X is hydrogen or methyl and n is 2, 3 or 4. The hydrocarbyl group R may be an aliphatic group or an aromatic group, but is preferably an aliphatic group. The polyfunctional acrylate monomers containing internal flexible units which are useful in the present invention, including those represented by Formula I, may be prepared by procedures well known to those skilled in the art. One method of preparing such monomers involves condensing a polyhydroxy compound to form one or more ether or alkyleneoxy linkages or reacting a polyhydroxy compound with an alkaline oxide such as ethylene oxide or propylene oxide to form ether (or alkyleneoxy) linkages and thereafter reacting the intermediate ether and hydroxy-containing compound with sufficient acrylic acid or acrylic ester or derivatives thereof to form the desired polyfunctional acrylate. For example, a useful polyfunctional acrylate monomer can be prepared by condensing or dimerizing ethylene glycol to form diethylene glycol and thereafter reacting the diethylene glycol with at least two moles of an acrylic acid or acrylic ester per mole of diethylene glycol.

Specific examples of suitable polyfunctional acrylate monomers containing at least one internal flexible unit include the following compounds. In the following examples as well as elsewhere in the specification and claims, unless specifically indicated otherwise, the term "acrylate" is intended to include substituted as well as unsubstituted acrylates. In particular, the term "acrylate" is intended to include alkyl acrylates containing from 1 up to 8 carbon atoms and more particularly the corresponding methacrylate derivatives.

diethylene glycol diacrylate
    triethylene glycol diacrylate
    tetraethylene glycol diacrylate
    polyethylene glycol diacrylate
    dipropylene glycol diacrylate
    tripropylene glycol diacrylate
    tetrapropylene glycol diacrylate
    polypropylene glycol diacrylate
    glyceryl ethoxylate diacrylate glyceryl propoxylate diacrylate
glyceryl ethoxylate triacrylate
glyceryl propoxylate triacrylate
trimethylolpropane ethoxylate triacrylate
trimethylolpropane propoxylate triacrylate
neopentylglycol ethoxylate diacrylate
neopentylglycol propoxylate diacrylate
monomethoxy trimethylolpropane ethoxylate diacrylate
pentaerythritol ethoxylate tetraacrylate
pentaerythritol propoxylate tetraacrylate
dipentaerythritol ethoxylate pentaacrylate
dipentaerythritol propoxylate pentaacrylate
di-trimethylolpropane ethoxylate tetraacrylate
Bisphenol A ethoxylate diacrylate
Bisphenol A propoxylate diacrylate Examples of polyfunctional acrylate monomers containing at least one internal flexible unit which is a hydrocarbylene group include 1,8-octanediol diacrylate, 1,10-decanediol diacrylate, polybutadiene diacrylate, etc.

The coating compositions of the present invention contain from about 60% to about 99% by weight of the polyfunctional acrylate monomers containing at least one internal flexible unit. In other embodiments, the radiation-curable coating compositions will contain at least 70% or at least 75% by weight of a polyfunctional acrylate monomer containing internal flexible units. The molecular weight of the polyfunctional acrylate monomers (A) may range from about 300 to about 15,000, preferably from about 300 to about 5,000; and more preferably from about 300 to about 3,000. The molecular weight may be a calculated molecular weight or an Mn determined by end group analysis.

The radiation-curable release coating compositions of the present invention also contain at least one other reactive vinyl or unsaturated monomer provided that the reactive vinyl monomer (B) is not the same as the polyfunctional acrylate monomer containing at least one internal flexible unit, component (A), described above or the radiation reactive organopolysiloxane (C) described below. The amount of such other vinyl monomers included in the radiation-curable coating composition of the invention may range from about 1% to about 30% and is more often from about 1% to about 20% or 25% by weight. The reactive vinyl or unsaturated monomers (B) useful in this invention include vinyl ethers, mono- and polyfunctional acrylate monomers or oligomers, vinyl esters, vinyl carboxylic acids, vinyl carboxylic acid salts, vinyl amides, and unsaturated dicarboxylic acids and derivatives thereof such as maleic and fumaric acids and derivatives thereof. In one preferred embodiment, the reactive vinyl monomer (B) is selected from the group consisting of vinyl ethers and mono- or polyfunctional acrylate oligomers, and the oligomers may or may not contain internal flexible units. In some instances, oligomers containing flexible units are preferred since they provide additional three-dimensional networks with flexibility between crosslinks on curing. In one presently preferred embodiment, the reactive material included in the radiation-curable coating compositions of the invention is a mono- or polyfunctional acrylate oligomer or a mixture of such oligomers and at least one vinyl ether. In another preferred embodiment, the reactive material (B) is at least one vinyl ether free of any mono- or polyfunctional acrylate oligomers.

Various vinyl ethers can be included in the coating compositions of the present invention, and these include ethers containing one or more vinyl groups. The vinyl ethers copolymerize with the acrylates and provide low viscosity properties to the mixtures and flexibility to the cured coating compositions. Specific examples of useful vinyl ethers include ethyl vinyl ether, butyl vinyl ether, hydroxy butyl vinyl ether, cyclohexyl vinyl ether, 2-ethylhexyl vinyl ether, octyl vinyl ether, decyl vinyl ether, dodecyl vinyl ether (Rapi-Cure DDVE), octadecyl vinyl ether, cyclohexane dimethanol monovinyl ether, phenyl vinyl ether, 1,6-hexanediol divinyl ether, 1,4-cyclohexane dimethanol divinyl ether (Rapi-Cure CHVE), diethylene glycol divinyl ether, triethylene glycol divinyl ether (Rapi-Cure DVE-3), tetraethylene glycol divinyl ether, dipropylene glycol divinyl ether, tripropylene glycol divinyl ether, tetrapropylene glycol divinyl ether, and the propenyl ether of propylene carbonate (Rapi-Cure PEPC). Ethers with more than one vinyl group such as 1-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether and tetrapropylene glycol divinyl ether are preferred. Diethylene glycol divinyl ether, triethylene glycol divinyl ether, dipropylene glycol divinyl ether and tripropylene glycol divinyl ether are most preferred. The Rapi-Cure vinyl ethers are available commercially from International Specialty Products, Wayne, N.J.

Examples of suitable polyfunctional acrylate oligomers useful in the radiation-curable compositions of the invention include the following types of acrylates:

aliphatic polyether urethane acrylates, diacrylates and polyacrylates;
aliphatic polyester urethane acrylates, diacrylates and polyacrylates;
aromatic polyether urethane acrylates, diacrylates and polyacrylates;
aromatic polyester urethane acrylates, diacrylates and polyacrylates;
polyester acrylates, diacrylates and polyacrylates;
polyether acrylates, diacrylates and polyacrylates;
epoxy acrylates, diacrylates and polyacrylates;
polyamine acrylates, diacrylates and polyacrylates; and
acrylated acrylic oligomers.

Acrylates are generally preferred over methacrylates because of higher cure speed.

Preferred acrylated oligomers are those containing internal flexible units such as aliphatic polyether urethane acrylates, diacrylates and polyacrylates; aliphatic polyester urethane acrylates, diacrylates and polyacrylates; aromatic polyether urethane acrylates, diacrylates and polyacrylates; aromatic polyester urethane acrylates, diacrylates and polyacrylates; and polyether acrylates, diacrylates and polyacrylates. Most preferred oligomers are aliphatic polyether urethane acrylates, diacrylates and polyacrylates; aliphatic polyester urethane acrylates, diacrylates and polyacrylates; and aliphatic polyether acrylates, diacrylates and polyacrylates.

Polyfunctional acrylate oligomers are available commercially from a variety of sources. Urethane acrylate oligomers are available from Morton Thiokol under the designations Uvithane 782 and Uvithane 783, and from Polymer Systems Corp., Orlando, Fla. under the designation PURELAST. Ebecryl 270 is an acrylated aliphatic urethane oligomer available from UCB Radcure, Atlanta, Ga. Epoxy acrylate oligomers are available, for example, from UCB Radcure, Atlanta, Ga. under the designations Novacure® 3600 and from Shell Chemical Company under the designation Epocryl 25A60. Although Epocryl 25A60 contains some volatile solvent, the product can be mixed with an acrylate monomer such as, for example, 1,6-hexanediol diacrylate, and the solvent originally present can be removed. An example of a commercially available acrylic acrylate oligomer is Novacure 6700 from UCB Radcure. An example of a commercially available polyamine acrylate oligomer is Novacure 7100 from UCB Radcure. This acrylate functional oligomeric amine is a liquid having a viscosity in the range of 500 to 1500 CPS at 25° C. and a theoretical molecular weight of 800, and the oligomer contains less than 10% of hexanediol diacrylate.

As noted above, the reactive material utilized in the coating compositions of the present invention also may be at least one mono- or polyfunctional acrylate monomer provided that the polyfunctional acrylate monomer is different from the polyfunctional acrylate monomer (A) containing at least one internal flexible unit. However, the reactive material (B) also may contain at least one internal flexible unit. Specific examples of mono- and polyfunctional acrylate monomers which can be utilized as a reactive material in the coating compositions of the present invention include one or more of the following: ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; isobornyl acrylate; acrylated epoxy soya oil; acrylated epoxy linseed oil; caprolactone acrylate; 2-phenoxyethyl acrylate; benzyl acrylate; monomethoxy tripropylene glycol monoacrylate; monomethoxy neopentyl glycol propoxylate monoacrylate; 1,3-butanediol diacrylate; 1,4-butanediol diacrylate; 1,6-hexanediol diacrylate; trimethyl-olpropanetriacrylate; glyceryltriacrylate; pentaerythritoltriacrylate; pentaerythritol tetraacrylate; dipentaerythritol pentaacrylate; di-trimethylolpropane tetraacrylate; tris(2-hyd roxyethyl) isocyanurate triacrylate, tetrahyd rofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate; Fluorescein diacrylate; and 3,8-diacryloyl ethidium bromide.

Acrylate monomers are generally preferred over methacrylate monomers because of higher cure speed. Difunctional and polyfunctional acrylate monomers are preferred for higher cure speed. Generally, the acrylate monomers with higher molecular weights are preferred due to lower volatility and lower odor. As the molecular weight is increased, however, there is generally an increase in viscosity so that the upper limit of molecular weight for monomers and oligomers may be determined based on viscosity considerations. A low overall viscosity generally is desired for fast wetout and coating at high speeds. The monomers and oligomers useful as reactive materials (B) in the present invention have calculated molecular weights from about 150 to about 15,000, preferably about 300 to about 5,000 or 10,000, and more preferably from about 300 to about 3,000. The molecular weight is either a calculated molecular weight based on the sum of the atomic weights of the atoms making up the monomer or oligomer, or the molecular weight is a number average molecular weight (Mn) which may be determined by end group analysis.

Examples of vinyl esters include vinyl propionate, vinyl acetate, vinyl 2-ethyl hexanoate, etc.

The radiation-curable release coating compositions of the present invention also contain (C) at least one organopolysiloxane containing one or more groups which are reactive toward free radical polymerization, e.g., radiation. Examples of such groups include vinyl groups including vinyl acrylate groups, vinyl ether groups, vinyl ester groups, and epoxy acrylate groups. The organopolysiloxane containing the radiation reactive groups are usually present in the release coating compositions of the present invention in amounts of from about 0.01% to about 10% by weight and more often from about 1% to about 6% by weight.

In one preferred embodiment, the organopolysiloxane (C) can be represented by the formula

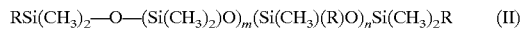

wherein in Formula (II) each R is —R$^1$—O(O)C—C(R$^2$)=CH$_2$, —R$^1$—O—C(R$^2$)=CH$_2$ or

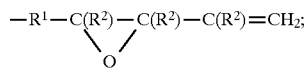

R$^1$ is a hydrocarbylene group containing from 1 to about 15 carbon atoms, or an oxyalkylene group containing from 1 to about 4 carbon atoms in the alkylene moiety; each R$^2$ is independently hydrogen or a methyl or ethyl group; m is a number from about 50 to about 300, and in one embodiment from about 120 to about 150; n is a number from about 1 to about 15, and in one embodiment from about 2 to about 10. R can be a vinyl acrylate, epoxy vinyl or vinyl ether group. In one embodiment, R is —(CH$_2$)$_6$OC(O)CH=CH$_2$. In another embodiment R is 4-vinyl cyclohexene epoxide. The hydrocarbylene group R$^1$ may be a divalent aliphatic, cycloaliphatic or aromatic group containing up to about 15 carbon atoms, and specific examples of hydrocarbylene groups include a methylene, ethylene, propylene, butylene, hexylene, heptylene, dodecalene, cyclohexene, phenylene, etc. R$^1$ can be an alkylene group of 1 to about 10 carbon atoms. Generally, R$^2$ is hydrogen. The organopolysiloxanes of Formula (II) may contain from 3 to about 17 R groups since n is defined as from about 1 to about 15. Thus, the value of n determines the amount of acrylate, epoxy vinyl or vinyl ether present in the organopolysiloxanes (C).

The acrylic functional organopolysiloxanes (C) can be prepared, for example, by reacting a siloxane containing hydroxy groups or epoxy groups with acrylic acid or methacrylic acid. The siloxanes containing a hydroxy group can be prepared by reacting a reactive siloxane (e.g., containing halogen) with a polyhydroxy compound such as ethylene glycol, propylene glycol, glycerol, or pentaerythritol.

The acrylic functional organopolysiloxanes (C) may also be identified as containing about 3% to about 75% by weight of acryloxy or methacryloxy groups, more often, from about 3% to about 15% by weight of the acryloxy or methacryloxy groups. Such polysiloxanes which are useful in this invention have an average molecular weight of from about 1000 to about 20,000. Siloxanes of higher molecular weight also may be used, but the higher molecular weight siloxanes are not preferred. The organopolysiloxanes may be linear or branched and are preferably substantially linear.

The epoxy functional organopolysiloxanes (C) can be prepared, for example, by a platinum catalyzed hydrosilation addition reaction between hydrogen atoms on the chain of a polydimethyl-methylhydrogen siloxane copolymer with organic molecules containing both ethylenic unsaturation and epoxide functionality, such as 4-vinylcyclohexene oxide.

The vinyl ether functional organopolysiloxanes (C) can be prepared, for example, by a platinum catalyzed hydrosilation addition reaction between hydrogen atoms on the polydimethyl-methylhydrogen siloxane copolymer with organic molecules containing two or more ethylenic unsaturated functional groups, such as 1,4-butanediol divinyl ether and trimethylolpropane trivinyl ether.

The organopolysiloxanes (C) are known in the art, and various methods for producing such organopolysiloxanes are described in a number of patents. In particular, the disclosures of U.S. Pat. Nos. 4,908,274 and 4,963,438 are hereby incorporated by reference for their disclosure of acrylate or methacrylate containing organopolysiloxanes and methods of preparing such organopolysiloxanes. The disclosure in U.S. Pat. No. 4,421,904 is hereby incorporated by reference for its disclosure of epoxy containing organopolysiloxanes and methods of preparing such organopolysiloxanes.

Organopolysiloxanes of the type represented by Formula (II) containing acryloxy groups are available commercially from, for example, Goldschmidt Chemical Corp., Hopewell, Va. Goldschmidt's silicone acrylate series include dimethylpolysiloxanes available under the general trade designation TERGO®RC. Specific examples of commercially available organopolysiloxanes containing acrylate groups include RC-450, RC-450N, RC-706, RC-707, RC-710, RC-720 and RC-726. Some of these polysiloxanes are of the type prepared by the reaction of acrylic acid or methacrylic acid with dimethylpolysiloxane containing hydroxyl groups or oxy groups. A particular example of a useful polysiloxane is available under the designation of RC-726. RC-726 is believed to be characterized by Formula (II) wherein each R is —(CH$_2$)$_6$OC(O)—CH═CH$_2$, m is 6, and n is about 136. The molecular weight of RC-726 is about 11,000. This organopolysiloxane contains about 9% by weight of acrylate. Organopolysiloxanes containing acryloxy or methacryloxy groups also are available for UCB Radcure under the general designation Ebecryl. Ebecryl 350 is a specific example of a useful silicone polyacrylate from UCB Radcure.

In another embodiment, the organopolysiloxane is a compound represented by Formula (II) wherein each R is —(CH$_2$)$_6$OC(O)CH═CH$_2$, m is 2 and n is about 100. This material contains about 4% by weight acrylate.

Organopolysiloxanes of the type represented by Formula (II) containing epoxy groups are available from the General Electric Co., Waterford, N.Y. A particular example of a useful organic polysiloxane is available under the trade designation UV 9315.

Organopolysiloxanes of the type represented by Formula (II) containing vinyl ether groups are available from Dow Corning Company under the general designation SYL-OFF. A particular example of such a vinyl ether silicone is SYL-OFF 7937 which is described as an alkoxy functional dimethyl siloxane.

In another embodiment, the organopolysiloxane (C) can be siloxane copolymers containing a lateral peripheral vinyl ether group connected by a bridge group to a silicon atom wherein the bridge group has the structure of an aliphatic or aromatic polyurethane. Siloxanes of this type are described in detail in U.S. Pat. No. 5,208,312, and the disclosure of such siloxanes in the '312 patent is hereby incorporated by reference.

These siloxane copolymers generally have molecular weights in the range of 5000 to 100,000 and can be represented by the formula

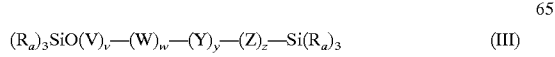  (III)

where

V=—SiR$_a$R$_b$O—;

W=SiR'$_a$(R$_c$—R$_d$—OCH═CH$_2$)O—;

Y=SiR$_a$R$_g$O—;

Z=—R$_a$R$_g$SiC$_n$H$_{2n}$R'$_f$C$_n$H$_{2n}$SiR$_a$R$_g$O— with n=2, 3 or 4; v, y, z are identical or different numbers, which can however not be zero simultaneously; w is always different from zero; and the ratio of v+y+z/w is between 1 and 100; the R$_a$ groups represent, independently of each other, an alkyl group such as CH$_3$, C$_2$H$_5$, n-C$_3$H$_7$ and n-C$_4$H$_{10}$ or a phenyl group, with not more than one phenyl group being attached to a given silicon atom;

R$_b$=R$_a$;

R'$_a$=R$_a$, —OCH$_3$ or OC$_2$H$_5$;

R$_c$=—C$_2$H$_4$—, —C$_3$H$_6$—, —C$_2$H$_4$—S—C$_2$H$_4$—, or —C$_3$H$_6$—S—C$_2$H$_4$—;

R$_d$=—OCONHR$_6$NHCO—, —NH—COOC$_2$H$_4$—, or NHCOOC$_3$H$_6$—;

R$_3$=—C$_6$H$_3$(CH$_3$)—, —C$_6$H$_4$CH$_2$C$_6$H$_4$—, —(CH$_2$)$_6$—, —C$_6$H$_{10}$—CH$_2$—C$_6$H$_{10}$—, or —CH$_2$—[(CH$_3$)$_3$C$_6$H$_7$]—;

R$_g$=—C$_k$H$_{2k}$—R$_f$ where k=2, 3 or 4;

R$_f$ is a perfluoroalkyl group with 1 to 12 carbon atoms such as —CF$_3$, —C$_2$F$_5$, —C$_3$F$_7$, —C$_4$F$_9$, —C$_6$F$_{13}$, or —C$_8$F$_{17}$, where the higher perfluoroalkyl groups can be formed by telomerization of tetrafluoroethylene (TFE), or a monovalent radical of an oligomer of fluorated oxetanes or oxiranes; R'$_f$ is a perfluoroalkylene group containing from 4 to 10 carbon atoms such as —C$_4$F$_8$—, —C$_6$F$_{12}$— or C$_8$F$_{16}$—, or an alpha,omega-fluoralkenyl group formed by the telomerization of tetrafluoroethylene or a divalent telochelating radical of an oligomer derived from fluorinated oxetanes or oxiranes, or a m-phenylenedi (hexafluoroisopropoxy) radical; the units V, W, Y and Z can be arranged randomly, in order, or alternated along the polymer chain.

The release coating compositions of the present invention also may contain (E) up to about 10% by weight of at least one thickener. Any thickener which is compatible with the release coating composition and which is effective in thickening the composition can be utilized. The presence of one or more thickeners is especially preferred when the composition is to be used to coat porous substrates such as paper. As mentioned, the thickener may be an organic thickener or an inorganic thickener. Examples of organic thickeners include cellulose-type thickeners which also are known in the art. Various inorganic thickeners can be utilized which are known in the art. Among the preferred inorganic thickeners are the various commercially available silica thickeners, including hydrophilic silicas and hydrophobic silicas. Hydrophobic amorphous fume silicas are particularly preferred as the thickening additive. Particularly preferred hydrophobic silicas are AEROSIL R-972 and AEROSIL R-974 from Degussa Corporation, Akron, Ohio.

When present in the release coating compositions of the present invention, the compositions will contain from about 0.01% to about 10% of the thickener, and more often from about 1% to about 3% of the thickener.

In one preferred embodiment, the coating composition of the present invention comprises:

(A) from about 60% to about 99% by weight of a first mixture comprising (1) at least one diacrylate monomer obtained by reacting two moles of acrylic acid or methacrylic acid with one mole of an ethoxylated or propoxylated aliphatic diol, and (2) at least one triacrylate obtained by reacting three moles of acrylic acid or methacrylic acid with one mole of an ethoxylated or propoxylated aliphatic triol;

(B) from about 1% to about 30% by weight of at least one mono- or polyfunctional acrylate oligomer which may optionally contain internal flexible units such as ethoxy and propoxy groups;

(C) from about 0.01% to about 10% by weight of an organopolysiloxane represented by Formula (II) above;

(D) from 0% to about 10% by weight of at least one photoinitiator; and (E) from 0% to about 5% by weight of at least one thickener as described above.

The weight ratio of diacrylate monomer to triacrylate monomer contained in the first mixture (A) may range from about 1 to 9 to about 9 to 1. Preferably the coating composition contains from about 70% or even 75% up to 99% by weight of (A), from about 1 to about 20 or 25% of (B), from about 1% to about 6% of (C), from 0% to about 5% of (D), and from 0% to about 5% of the thickener (E).

Specific examples of first mixtures comprising at least one diacrylate monomer and at least one triacrylate monomer include: glyceryl propoxylate diacrylate and glyceryl ethoxylate triacrylate; glyceryl ethoxylate diacrylate and glyceryl ethoxylate triacrylate; neopentyl glycol propoxylate diacrylate and trimethylolpropane propoxylate triacrylate; etc.

In another preferred embodiment, the above coating composition which comprises a first mixture (A) of a diacrylate monomer and a triacrylate monomer, (B) at least one mono- or polyfunctional acrylate oligomer, (C) an organopolysiloxane containing acryloxy groups, (D) a photoinitiator, and (E) at least one thickener, may also contain at least one vinyl ether. Any of the vinyl ethers described above can be utilized in this combination. The vinyl ethers copolymerize with the acrylates, and their use improves the flexibility and low viscosity properties of the compositions of the invention. The amount of vinyl ether included in such compositions may range from about 1% to about 10% by weight.

The coating compositions of the present invention are radiation-curable, and thus, the coating compositions may contain from 0% to about 10%, more often from 0% to about 5% by weight of at least one photoinitiator. A photoinitiator is not required when the coating compositions are to be cured by electron beam (EB) processes. A photoinitiator is necessary when the compositions are to be cured by ultraviolet (UV) light. Photoinitiators are classified in two major groups based upon a mode of action. Cleavage-type photoinitiators include acetophenones, benzoin ethers, benzoyl oximes and acyl phosphines. Abstraction-type photoinitiators include benzophenone, Michler's ketone, thioxanthones, anthraquinone, camphorquinone and ketocoumarin. Abstraction-type photoinitiators function better in the presence of materials such as amines and other hydrogen donor materials added to provide labile hydrogen atoms for abstraction. In the absence of such added materials, photoinitiation may still occur via hydrogen abstraction from monomers, oligomers or other components of the system.

Examples of photoinitiators which may be used include one or more of the following:

benzophenone
benzyldimethyl ketal
isopropylthioxanthone
bis(2,6-dimethoxybenzoyl)(2,4,4-trimethylpentyl) phosphineoxide
2-hydroxy-2-methyl-1-phenyl-1-propanone
diphenyl(2,4,6-trimethybenzoyl)phosphine oxides
1-hydroxycyclohexyl phenyl ketone
2-benzyl-2-(dimethylamino)-1-[4-(4-morpholinyl) phenyl]-1-butanone
α,α-dimethoxy-α-phenylacetophenone
2,2-diethoxyacetophenone
2-methyl-1-[4-(methylthio)phenyl]-2-(4-morpholinyl)-1-propanone
2-hydroxy-1-[4-(hydroxyethoxy)phenyl]-2-methyl-1-propanone It is generally preferably to use combinations of photoinitiators to achieve the best possible surface and through cure of coating compositions. Reactive photoinitiators, which contain polymerizable groups, may also be used in order to react the photoinitiator molecules into the cross-linked polymer matrix. Photoinitiators are preferably used in the least amount necessary to get initiation of cure at the line speed of the process. The cure process is generally more efficient in the absence of oxygen, for example, in the presence of nitrogen, so a greater amount of photoinitiator is generally required in the presence of oxygen.

Examples of hydrogen donor materials which may be utilized in combination with photoinitiators include, but are not limited to, one or more of the following:

ethyl-4-dimethylaminobenzoate
octyl-p-(dimethylamino)benzoate
N-methyidiethanolamine
dimethylethanolamine
triethanolamine
tri-n-propylamine
diethylethanolamine
triethylamine
diisopropylethylamine
diisopropylethanolamine
dimethylaminomethylphenol
tris(dimethylaminomethyl)phenol
benzyldimethylamine
amine acrylates
amine methacrylates Any appropriate type of lamp, for example, mercury vapor, pulsed xenon, or electrodeless, may be used for UV curing. Choice of photoinitiator or photoinitiator combinations, with characteristic absorbance spectra, should be matched with the spectral output of the bulb, for example, H bulb, D bulb, Q bulb, or V bulb, for highest curing efficiency.

In addition to the above-described components, the various compositions of the present invention may include other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those which do not have appreciable absorption in the wavelengths of interest.

Examples of pigments and filler materials include, but are not limited to, titanium dioxide, hydrophobic amorphous fumed silica, amorphous precipitated silica, carbon black, and polymer powders. Examples of flow and leveling additives, wetting agents, and antifoaming agents include silicones, hydrocarbons, fluorine-containing compounds, and non-silicone polymers and copolymers such as copolyacrylates.

Examples of stabilizers include, but are not limited to:

tetrakis[methylene(3,5-di-tert-butyl-4-hydroxy-hydrocinnamate)]-methane;

thiodiethylene bis(3,5-di-tert-butyl-4-hydroxy-hydrocinnamate);

octadecyl 3,5-di-tert-butyl-4-hydroxyhydro-cinnamate;

bis(1,2,2,6,6-pentamethyl-4-piperidinyl)sebacate;

methyl (1,2,2,6,6-pentamethyl-4-piperidinyl)sebacate; and decanedioic acid, bis(2,2,6,6-tetramethyl-4-piperidinyl) ester, reaction products with 1,1-dimethylethylhydroperoxide and octane.

The radiation-curable coating compositions of the present invention generally are free or substantially free of methacrylic functionalized colloidal silica for the type described in EP Patent Application 0 505 737 A1. In another embodiment, the coating compositions of the present invention are also free or substantially free of N-vinyl formamide.

The radiation-curable coating compositions of the present invention are prepared by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The following examples illustrate the radiation-curable compositions of the present invention. Unless otherwise indicated in the following examples, in the specification and in the appended claims, all parts and percentages are by weight, temperatures are in degrees centigrade and pressures are at or near atmospheric pressure.

In the following examples, the commercial components are identified as follows:

| Tradename | Chemical | Supplier |
|---|---|---|
| Novacure ® 3600 | epoxy acrylate oligomer | UCB-Radcure |
| Ebecryl ® 270 | acrylated aliphatic urethane oligomer | UCB-Radcure |
| Ebecryl ® 8402 | aliphatic urethane diacrylate oligomer | UCB-Radcure |
| Photomer ® 4127 | neopentylglycol propoxylate diacrylate | Henkel |
| Photomer ® 4072 | trimethylolpropane propoxylate triacrylate | Henkel |
| Rapi-Cure ® CHVE | 1,4-cyclohexane dimethanol divinyl-ether | International Specialty Products (ISP) |
| Rapi-Cure ® DDVE | dodecyl vinyl ether | ISP |
| Rapi-Cure ® DVE-3 | triethylene glycol divinyl ether | ISP |
| Rapi-Cure ® PEPC | propenyl ether of propylene carbonate | ISP |
| BYK ®-080 | polysiloxane defoamer | BYK-Chemie |
| BYK ®-361 | acrylic copolymer wetting agent | BYK-Chemie |
| Darocur ® 1173 | 2-hydroxy-2-methyl-1-phenyl-1-propanone | Ciba-Geigy |
| Irgacure ® 500 | mixture of benzophenone and 1-hydroxy cyclohexyl phenyl ketone | Ciba-Geigy |
| CGI-1700 | mixture of bis(2,6-dimethoxy-benzoyl) (2,4,4-trimethylpentyl)-phosphine oxide and 2-hydroxy-2-methyl-1-phenyl-1-propanone | Ciba-Geigy |
| Ebecryl 350 | a silicone acrylate | UCB-Radcure |
| SYL-OFF 7937 | a vinyl ether silicone | Dow Chemical |
| Aerosil R-972 | hydrophobic silica | Degussa |
| Aerosil R-974 | hydrophobic silica | Degussa |

EXAMPLE 1

| | Parts/Wt. |
|---|---|
| neopentyl glycol propoxylate diacrylate | 70 |
| Novacure ® 3600 | 25 |
| Ebecryl 350 | 5 |

EXAMPLE 2

| | |
|---|---|
| dipropylene glycol diacrylate | 30 |
| glyceryl ethoxylate triacrylate | 47 |
| Novacure 3600 | 20 |
| SYL-OFF 7937 | 3 |

EXAMPLE 3

| | |
|---|---|
| dipropylene glycol diacrylate | 30.0 |
| glyceryl ethoxylate triacrylate | 45.0 |
| Novacure 3600 | 17.5 |
| Ebecryl 350 | 5.0 |
| CGI-1700 | 2.5 |

EXAMPLE 4

| | |
|---|---|
| Photomer 4127 | 30.0 |
| Photomer 4072 | 44.0 |
| Ebecryl 270 | 10.0 |
| Ebecryl 350 | 3.4 |
| BYK-080 | 0.4 |
| BYK-361 | 0.2 |
| Rapi-Cure CHVE | 5.0 |
| Darocur-1173 | 5.0 |
| Aerosil R-972 | 2.0 |

EXAMPLE 5

| | |
|---|---|
| Photomer 4127 | 15.4 |
| Photomer 4072 | 59.0 |
| Ebecryl 270 | 5.0 |
| Ebecryl 350 | 3.0 |
| BYK-080 | 0.4 |
| BYK-361 | 0.2 |
| Rapi-Cure DVE-3 | 10.0 |
| Irgacure 500 | 5.0 |
| Aerosil R-972 | 2.0 |

EXAMPLE 6

| | |
|---|---|
| Photomer 4127 | 15.7 |
| Photomer 4072 | 63.4 |
| Ebecryl 8402 | 4.8 |
| Ebecryl 350 | 2.0 |
| BYK-080 | 0.4 |
| BYK-361 | 0.2 |
| Rapi-Cure DVE-3 | 9.6 |
| Irgacure 500 | 1.9 |
| Aerosil R-972 | 2.0 |

EXAMPLES 7–11

|              | 7    | 8    | 9    | 10   | 11   |
|--------------|------|------|------|------|------|
| Photomer 4127 | 15.1 | 15.2 | 15.2 | 15.7 | 15.7 |
| Photomer 4072 | 60.7 | 61.4 | 61.1 | 63.0 | 63.0 |
| Ebecryl 8402 | 4.6  | 4.6  | 4.6  | 4.8  | 4.8  |
| SYL-OFF 7937 | 5.0  | 4.0  | 3.0  | 3.0  | 1.5  |
| BYK-080      | 0.4  | 0.4  | 0.4  | 0.4  | 0.4  |
| BYK-361      | 0.2  | 0.2  | 0.2  | 0.2  | 0.2  |
| Rapi-Cure DVE-3 | 10.7 | 12.3 | 12.2 | 11.0 | 11.0 |
| Irgacure 500 | 1.8  | 1.9  | 1.8  | 1.9  | 1.9  |
| Aerosil R-974 | 1.5  | —    | 1.5  | —    | 1.5  |

The release coating compositions of the present invention as described above exhibit desirable release properties and improved adhesion to substrates such as polymeric films, paper substrates, metallic or metallized films, pressure-sensitive adhesive films, and paper constructions. The coating compositions also may be used as ink binders and overprint varnishes. The radiation-cured release coating compositions of the present invention generally impart improved chemical resistance, moisture resistance, temperature resistance and weathering resistance to the substrates.

The radiation-curable release coating compositions of the present invention may be applied to various substrates as a coating by any conventional means known in the coating art such as by roller coating, brushing, spraying, reverse roll coating, dipping, offset gravure, etc. The coating compositions of the present invention may be heated or cooled to facilitate the coating process and to alter the depth or penetration of the liquid into the substrate prior to curing.

The amount of radiation-curable release composition applied to one surface of a substrate may be varied depending upon the characteristics of the substrate, the characteristics desired to be imparted to the substrate, and the particular formulation of the curable mixture. If an excess of the coating composition is applied to the substrate, the physical characteristics of the substrate may be affected in an undesirable manner. Also, for economic reasons, it is normally desired to apply the lowest amount of coating needed to obtain the desired results. Also, as noted above, when the substrate is a porous material such as paper, it is preferred to use a formulation containing at least one thickener. Typically, the applied coating weights may, depending on the substrate and intended use, range from about 0.1 to about 25 grams/m$^2$. More often, applied coating weights are from about 0.5 to about 1.5 grams/m$^2$. At these levels, the release coated substrate is characterized as having good releasability, increased dimensional stability, increased strength, increased thermal stability, and increased resistance to solvents and moisture.

The substrates which have been coated with the radiation-curable release coating compositions can be cured by exposure to known forms of ionizing or actinic non-ionizing radiation. Useful types of radiation include visible light, ultraviolet light, electron beam, x-ray, gamma-ray, beta-ray, etc. As noted above, if visible light or ultraviolet light is to be used as the form of radiation, a photoinitiator such as those described above is included in the curable coating composition. Photoinitiators are not required for electron beam curing. One of the advantages of using radiation to effect curing of the composition is that polymerization takes place rapidly at ambient temperature, and heating is not necessary. The equipment for generating these forms of radiation are well known to those skilled in the art. Electron beam radiation and ultraviolet light are the presently preferred forms of radiation to be used with the compositions of the present invention.

Curing of the coating composition can be effected in a continuous manner by passing the coated substrate through radiation equipment which is designed to provide the coated substrate with sufficient residence time to completely cure the coating. Curing may be effected at or near atmospheric pressure or in an inert atmosphere such as nitrogen or argon. An inert atmosphere is preferred. The length of exposure necessary to cure the coating compositions varies with such factors as the particular formulation used, the type and wavelength of radiation, dosage rate, the atmosphere, energy flux, concentration of photoinitiator (when required), and the thickness of the coating. For electron beam curing, dosage rates of from 0.1 to about 10 megarads, generally below 4 megarads, provide the desirable curing. For UV curing, dosage rates of generally 100–500 milli Joules provide the desired curing. Generally, the exposure is quite brief and curing is completed in less than about 0.001 to about 0.1 seconds. The actual exposure time required to give proper curing for various coatings can be readily determined by one skilled in the art with a minimum of experimentation. Excess curing of the coatings generally should be avoided.

Composite laminates can be prepared in accordance with the present invention, and said composite laminates comprise (A) a substrate;

(B) a coating bonded to one surface of said substrate, said coating comprising a radiation-cured composition of the present invention as described above; and (C) an adhesive on the other surface of said substrate.

The substrate which is included in the composite laminates of the present invention may be any of the substrate materials described above such as paper, polymeric films in the form of sheets and strips, etc. In one preferred embodiment, the substrate is a polymeric film, and a more preferred embodiment, the substrate is a polymeric film formed from a thermoplastic material such as a polyolefin, a polycarbonate, a polyester, etc.

The composite laminates can be prepared by coating one surface of the substrate with a radiation-curable coating composition of the present invention by the procedures and in the amounts described above. After application of the curable coating composition to the substrate, the curable coating is cured by radiation.

Following the application of the radiation-curable coating composition to one surface of the substrate, an adhesive coating is applied to the other surface of the substrate. The adhesive may be applied to the other surface either before or after the curable coating on the other surface has been radiation-cured. Preferably, the curable coating is cured before the adhesive is applied to the other surface of the substrate.

The amount of adhesive applied to the other surface of the substrate may range from about 1 to about 100 grams/m$^2$, and more often, the amount is in the range of from about 15 to about 45 grams/M$^2$. Although any suitable adhesive may be used including hot melt and pressure-sensitive adhesives, in one preferred embodiment, the adhesive is a pressure-sensitive adhesive. Any adhesive may be applied to the substrate which forms an aggressive adhesive bond to the substrate and to any other surface to which the substrate is to be adhered.

Any pressure-sensitive adhesive known in the art can be used in preparing the composites of the present invention, and pressure-sensitive adhesive compositions are described in, for example, "Adhesion and Bonding," *Encyclopedia of Polymer Science and Engineering,* Vol. 1, pp. 476–546, Interscience Publishers, 2d Edition, 1985, the disclosure of which is hereby incorporated by reference. Such compositions generally contain an adhesive polymer such as natural, reclaimed or styrene butadiene rubber, tackified natural and synthetic rubbers, styrene-butadiene or styrene-isoprene block copolymers, random copolymers of ethylene and vinyl acetate, ethylene-vinyl-acrylic terpolymers, polyisobutylene, poly(vinyl ether), poly(acrylic)ester, etc., as a major constituent. Other materials may be included in the pressure-sensitive adhesive composition such as resin tackifiers including, for example, rosin esters, oil-soluble phenolics or polyterpenes; antioxidants; plasticizers such as mineral oil or liquid polyisobutylenes; and fillers such as zinc oxide or hydrated alumina. The selection of the pressure-sensitive adhesive to be used in any composites of the invention is not critical to this invention, and those skilled in the art are familiar with the many suitable pressure-sensitive adhesives for particular applications.

The composites of the present invention may be prepared in various forms including webs which may be in roll form and which can thereafter be cut or slit into strips or sheets of desired dimensions. The order in which the radiation-curable coating and the adhesive coating are applied to the substrate is not critical. In one embodiment, the radiation-curable coating composition is applied to one surface of the substrate, and the adhesive is thereafter applied to the other surface of the substrate followed by curing of the radiation-curable coating composition. In another embodiment, the radiation-curable coating composition is applied to one surface of the substrate and cured. Thereafter, an adhesive is applied to the other surface of the substrate. The adhesive may be applied to the substrate soon after the radiation-curable coating has been cured, or the adhesive can be applied at a much later time such as just prior to use. In another embodiment, the curable coating can be put on after the adhesive.

The following examples illustrate the coated substrates and the composites of the present invention.

EXAMPLE A (A) substrate: polyethylene
(B) radiation-cured coating: Example 6

EXAMPLE B (A) substrate: biaxially oriented polypropylene film
(B) radiation-cured coating: Example 7

EXAMPLE C (A) substrate: polyethylene film
(B) radiation-cured coating: Example 7
(C) adhesive: pressure-sensitive adhesive

EXAMPLE D (A) substrate: biaxially oriented polypropylene film
(B) radiation-cured coating: Example 8
(C) adhesive: pressure-sensitive adhesive The substrates which are coated with the radiation-cured compositions of the present invention and the composite laminates in which a substrate is coated with the radiation-cured compositions of the present invention are characterized as having an improved, chemical resistance, moisture resistance, temperature resistance and weathering resistance.

The release characteristics of the coating compositions of the invention have been demonstrated by applying the coating compositions to paper as described above, and thereafter determining the release value using HS-1 Test Tape according to the standard 90° release test procedure. This test employs a 90° TLMI Release Tester and 2"×12" samples. The results are read directly in grams. The results obtained with the release coatings of several of the Examples of this invention are summarized in the following table. In the table, SGE paper is a semi-gloss Elite paper which has been coated and calendared for increased smoothness, gloss, print resolution and ink hold-out as compared to the 44# paper. Control-1 is a coating formulation like Example 6 without Ebecryl 350 and Aerosil R-972.

TABLE

| | Release Values | |
|---|---|---|
| Type of Paper | Release Coating of Example | Release Values (grams) |
| SGE | no coating | 458 |
| SGE | Control-1 | 462 |
| SGE | 6 | 22.2 |
| 44# | 7 | 31.6 |
| 44# | 8 | 34.0 |
| 44# | 9 | 35.5 |
| 44# | 10 | 50.0 |
| 44# | 11 | 90.0 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A radiation-curable release coating composition comprising:
   (A) from about 60% to about 99% by weight of at least one polyfunctional acrylate monomer containing at least one internal flexible unit;
   (B) from about 1% to about 30% by weight of at least one other reactive vinyl or unsaturated monomer provided the reactive monomer is not the same as the monomer of (A) or (C);
   (C) from about 0.01% to about 10% by weight of at least one organopolysiloxane containing one or more groups which are reactive toward free radical polymerization; and
   (D) from about 0% to about 10% by weight of at least one photoinitiator.

2. The release coating composition of claim 1 comprising from about 75% to about 99% by weight of the polyfunctional acrylate monomer (A).

3. The release coating composition of claim 1 which is free of N-vinylformamide.

4. The release coating composition of claim 1 wherein the internal flexible unit of the polyfunctional acrylate monomer (A) is a hydrocarbylene group containing at least 8 carbon atoms or an aliphatic ether group.

5. The release coating composition of claim 1 wherein the polyfunctional acrylate monomer (A) contains at least one aliphatic ether group.

6. The release coating composition of claim 5 wherein the ether groups are selected from ethoxy, propoxy or combinations of ethoxy and propoxy groups.

7. The release coating composition of claim 1 wherein the organopolysiloxane (C) is selected from silicone acrylates, vinyl ether silicones and epoxysilicones.

8. The release coating composition of claim 1 also containing from about 0.01% to about 10% by weight of at least one thickener.

9. A radiation-curable release coating composition comprising:
(A) from about 60% to about 99% by weight of at least one polyfunctional acrylate monomer containing at least one internal flexible unit;
(B) from about 1% to about 30% by weight of at least one reactive vinyl monomer selected from the group consisting of vinyl ethers, mono- or polyfunctional acrylate monomers or oligomers, and mixtures thereof, provided the polyfunctional acrylate monomer is not the same as the monomer of (A);
(C) from about 0.01% to about 10% by weight of an organopolysiloxane represented by the formula $$RSi(CH_3)_2O(Si(CH_3)_2O)_m(Si(CH_3)(R)O)_nSi(CH_3)_2R \qquad (III)$$

wherein each R is independently

—R'O(O)C—C($R^2$)=$CH_2$,

—R'—O—C($R^2$)=$CH_2$, or

—R'—C($R^2$)—C($R^2$)—C($R^2$)=$CH_2$,
         \\   /
           O

R' is a hydrocarbylene group containing from 1 to about 15 carbon atoms or an oxyalkylene group containing from 1 to about 4 carbon atoms in the alkylene moiety, each $R^2$ is independently hydrogen, or a methyl or ethyl group, m is a number from about 50 to about 300, and n is a number from 1 to about 15;
(D) from about 0% to about 10% by weight of at least one photoinitiator, provided that the composition is free of methacrylic functionalized colloidal silica; and
(E) from 0% to about 10% of at least one thickener.

10. The release coating composition of claim 9 comprising from about 75% to about 99% by weight of the polyfunctional acrylate monomer (A).

11. The release coating composition of claim 9 which is free of N-vinylformamide.

12. The release coating composition of claim 9 wherein the internal flexible unit of the polyfunctional acrylate monomer (A) is a hydrocarbylene group containing at least 8 carbon atoms or an aliphatic ether group.

13. The release coating composition of claim 9 wherein the polyfunctional acrylate monomer (A) contains at least one aliphatic ether group.

14. The release coating composition of claim 13 wherein the ether groups are selected from ethoxy, propoxy or combinations of ethoxy and propoxy groups.

15. The release coating composition of claim 9 comprising at least two polyfunctional acrylate monomers containing at least one internal flexible unit.

16. The release coating composition of claim 9 wherein the polyfunctional acrylate monomer (A) is selected from the group consisting of diethylene glycol diacrylate, triethylene glycol diacrylate, tetraethylene glycol diacrylate, polyethylene glycol diacrylate, dipropylene glycol diacrylate, tripropylene glycol diacrylate, tetrapropylene glycol diacrylate, polypropylene glycol diacrylate, trimethylolpropane ethoxylate triacrylate, trimethylolpropane propoxylate triacrylate, glyceryl ethoxylate diacrylate, glyceryl propoxylate diacrylate, glyceryl ethoxylate triacrylate, glyceryl propoxylate triacrylate, neopentylglycol ethoxylate diacrylate, neopentylglycol propoxylate diacrylate, and combinations thereof.

17. The release coating composition of claim 9 wherein the reactive material (B) comprises a mono- or polyfunctional acrylate oligomer selected from the group consisting of aliphatic polyether urethane acrylates, aliphatic polyester urethane acrylates, aromatic polyether urethane acrylates, aromatic polyester urethane acrylates, and polyether acrylates.

18. The release coating composition of claim 9 wherein the reactive material (B) is an oligomer selected from the group consisting of aliphatic polyether urethane acrylates, aliphatic polyester urethane acrylates and aliphatic polyether acrylates.

19. The release coating composition of claim 9 wherein the reactive material (B) is a mono- or polyfunctional acrylate monomer or oligomer characterized as having a molecular weight of from about 300 to about 15,000.

20. The release coating composition of claim 9 wherein the reactive material (B) comprises a vinyl ether.

21. The release coating composition of claim 9 wherein the reactive material (B) comprises a mixture of at least one vinyl ether and at least one mono- or polyfunctional acrylate oligomer.

22. The release coating composition of claim 9 wherein the organopolysiloxane (C) is characterized by Formula (II) wherein R is

—R'O(O)C—C(R2)=$CH_2$

23. The release coating composition of claim 9 wherein the organopolysiloxane (C) is characterized by Formula (II) wherein R is

—R'OC($R^2$)=$CH_2$

24. The release coating composition of claim 9 containing 0.01% to about 10% by weight of a hydrophobic silica as a thickener (E).

25. A radiation-curable release coating composition comprising:
(A) from about 60% to about 99% by weight of at least one polyfunctional acrylate monomer containing at least one internal ether group;
(B) from about 1% to about 30% by weight of at least one reactive material selected from the group consisting of vinyl ethers, mono- or polyfunctional acrylate monomers or oligomers, and mixtures thereof provided the polyfunctional acrylate monomer is not the same as the monomer of (A);
(C) from about 1% to about 10% by weight of an organopolysiloxane characterized by the formula $$RSi(CH_3)_2O(Si(CH_3)_2O)_m(Si(CH_3)(R)O)_nSi(CH_3)_2R \qquad (II)$$

wherein each R is independently

—R'O(O)C—C($R^2$)=$CH_2$, each R' is a hydrocarbylene group containing from 1 to about 15 carbon atoms, each $R^2$ is independently hydrogen, or a methyl or ethyl group, m is a number from about 50 to about 300, and n is a number from 1 to about 15;
(D) from about 0% to about 10% by weight of at least one photoinitiator; and (E) from about 0.01% to about 10% by weight of an inorganic thickener.

26. The release coating composition of claim 25 comprising from about 75% to about 99% by weight of the polyfunctional acrylic monomer (A).

27. The release coating composition of claim 25 wherein the polyfunctional acrylate monomer (A) is characterized by the formula

$$R-(OC(O)C(X)=CH_2)_n \qquad (I)$$

wherein R is a hydrocarbyl group containing from about 4 to about 20 carbon atoms and one or more ether linkages; X is hydrogen or an alkyl group containing from 1 to 8 carbon atoms; and n is at least 2.

28. The release coating composition of claim 27 wherein X is hydrogen or a methyl group.

29. The release coating composition of claim 27 wherein n is 2, 3 or 4.

30. The release coating composition of claim 25 wherein the polyfunctional acrylate monomer (A) is the reaction product of an ethoxylated or propoxylated polyhydroxy compound with acrylic or methacrylic acid.

31. The release coating composition of claim 25 wherein the reactive material (B) is at least one mono- or polyfunctional acrylate oligomer selected from the group consisting of aliphatic polyether urethane acrylates, aliphatic polyester urethane acrylates, and aliphatic polyether acrylates.

32. The release coating composition of claim 25 wherein (B) comprises a mixture of at least one vinyl ether and at least one polyfunctional acrylate oligomer.

33. The release coating composition of claim 25 wherein the inorganic thickener is a hydrophobic silica.

34. A method of coating a substrate comprising applying to said substrate, a radiation-curable release coating composition of claim 1, and exposing the coated substrate to a radiation source to cure the coating composition.

35. The method of claim 34 wherein the release coating composition contains a photoinitiator, and the release coating composition is cured by ultraviolet radiation or visible light.

36. The method of claim 34 wherein the release coating composition does not contain a photoinitiator, and the release coating composition is cured by electron beam radiation.

37. The method of claim 34 wherein the substrate is a polymeric film.

38. A method of coating a substrate comprising applying to said substrate, a radiation-curable release coating composition of claim 25, and exposing the coated substrate to a radiation source to cure the coating composition.

39. The method of claim 38 wherein the release coating composition contains a photoinitiator, and the release coating composition is cured by ultraviolet radiation or visible light.

40. The method of claim 38 wherein the release coating composition does not contain a photoinitiator, and the release coating composition is cured by electron beam radiation.

41. The method of claim 38 wherein the substrate is a polymeric film.

42. A substrate coated in accordance with the method of claim 34.

43. A substrate coated in accordance with the method of claim 38.

44. A multilayer composite comprising:
(A) a polymer substrate;
(B) a release coating on one surface of said substrate, said release coating comprising a radiation-cured composition of claim 1; and
(C) an adhesive on the other surface of said substrate.

45. A multilayer composite comprising:
(A) a polymer substrate;
(B) a release coating on one surface of said substrate, said release coating comprising a radiation-cured composition of claim 25; and
(C) an adhesive on the other surface of said substrate.

46. The composite of claim 45 wherein the substrate is a polymeric film.

47. The composite of claim 46 wherein the polymeric film is formed from a thermoplastic material.

48. The composite of claim 44 wherein the adhesive (C) is a pressure-sensitive adhesive.

* * * * *